(12) United States Patent
Yabuuchi

(10) Patent No.: US 10,471,836 B2
(45) Date of Patent: Nov. 12, 2019

(54) VEHICLE-MOUNTED CHARGING SYSTEM

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Yasuhiro Yabuuchi, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 126 days.

(21) Appl. No.: 15/748,273

(22) PCT Filed: Jul. 26, 2016

(86) PCT No.: PCT/JP2016/071889
§ 371 (c)(1),
(2) Date: Jan. 29, 2018

(87) PCT Pub. No.: WO2017/022572
PCT Pub. Date: Feb. 9, 2017

(65) Prior Publication Data
US 2018/0215278 A1    Aug. 2, 2018

(30) Foreign Application Priority Data
Aug. 5, 2015    (JP) .................................. 2015-155424

(51) Int. Cl.
*H02J 7/00*    (2006.01)
*B60L 53/60*    (2019.01)
(Continued)

(52) U.S. Cl.
CPC ......... *B60L 11/1838* (2013.01); *B60L 3/0046* (2013.01); *B60L 3/04* (2013.01);
(Continued)

(58) Field of Classification Search
CPC ...... B60L 11/1838; B60L 3/0046; B60L 3/04; B60L 53/60; H02J 7/0073; H04L 12/40013; H01R 31/065; H01M 10/48; H01M 10/44
(Continued)

(56) References Cited

U.S. PATENT DOCUMENTS 5,650,710 A * 7/1997 Hotta .................... B60L 3/0046
                                                                     320/128
5,686,812 A * 11/1997 Hotta .................... H02J 7/0031
                                                                     320/134
(Continued)

FOREIGN PATENT DOCUMENTS

| JP | H11-135159 A | 5/1999 |
| JP | 2012-210080 A | 10/2012 |
| JP | 2014-117975 A | 6/2014 |

OTHER PUBLICATIONS

Search Report for PCT/JP2016/071889, dated Oct. 4, 2016.

*Primary Examiner* — Robert Grant
*Assistant Examiner* — John T Trischler
(74) *Attorney, Agent, or Firm* — Honigman LLP

(57) ABSTRACT

A vehicle-mounted charging system is provided that can charge a battery regardless of the charging method and prevent an abnormal current from occurring between a vehicle and a charging station. A first charging controller, controls charging in accordance with a first charging method, communicates with a first charging apparatus via a charging cable connected to a first inlet, and charges a battery by turning on a DC cutoff relay, provided on a power supply path from the first inlet to the battery. If it is (Continued)

determined that charging is to be performed in accordance with a second charging method, a charging control unit relays communication between a second charging apparatus and the first charging controller. The charging control unit performs control to delay the timing of actually turning on the DC cutoff relay relative to the timing at which the first charging controller turns on the DC cutoff relay.

7 Claims, 9 Drawing Sheets

(51) Int. Cl.
| | |
|---|---|
| *B60L 11/18* | (2006.01) |
| *H01M 10/44* | (2006.01) |
| *H01M 10/48* | (2006.01) |
| *H01R 31/06* | (2006.01) |
| *H04L 12/40* | (2006.01) |
| *B60L 3/00* | (2019.01) |
| *B60L 3/04* | (2006.01) |

(52) U.S. Cl.
  CPC ............ *B60L 53/60* (2019.02); *H01M 10/44* (2013.01); *H01M 10/48* (2013.01); *H01R 31/065* (2013.01); *H02J 7/0073* (2013.01); *H04L 12/40013* (2013.01); *H01R 2201/26* (2013.01); *H02J 7/0022* (2013.01); *H02J 7/0027* (2013.01); *H02J 2007/0096* (2013.01); *H04L 2012/40215* (2013.01); *H04L 2012/40273* (2013.01); *Y02T 10/7005* (2013.01); *Y02T 90/121* (2013.01); *Y02T 90/16* (2013.01)

(58) Field of Classification Search
  USPC ....................................................... 320/109
  See application file for complete search history.

(56) References Cited

U.S. PATENT DOCUMENTS

| | | | | |
|---|---|---|---|---|
| 5,739,668 | A * | 4/1998 | Nishikiori | H02J 7/0036 320/111 |
| 5,765,656 | A * | 6/1998 | Weaver | B60L 58/10 180/65.22 |
| 6,459,175 | B1 * | 10/2002 | Potega | G01R 31/36 307/149 |
| 7,886,857 | B2 * | 2/2011 | Fujitake | B60L 3/0046 180/65.29 |
| 8,028,780 | B2 * | 10/2011 | Sagawa | B60K 15/05 180/65.27 |
| 8,179,086 | B2 * | 5/2012 | Nakaso | B60W 10/08 320/104 |
| 8,229,616 | B2 * | 7/2012 | Aridome | B60L 58/21 701/22 |
| 8,368,350 | B2 * | 2/2013 | Iwanaga | B60L 53/18 320/109 |
| 8,476,865 | B2 * | 7/2013 | Iwanaga | B60K 6/445 320/104 |
| 8,525,480 | B2 * | 9/2013 | Anderson | H02J 7/0077 320/132 |
| 8,541,978 | B2 * | 9/2013 | Fukuo | B60L 3/0069 320/109 |
| 8,655,535 | B2 * | 2/2014 | Oh | B60L 15/2045 701/22 |
| 8,666,572 | B2 * | 3/2014 | Mitsutani | B60K 1/02 701/22 |
| 8,704,495 | B2 * | 4/2014 | Sakai | H02J 7/041 320/155 |
| 8,774,997 | B2 * | 7/2014 | Ichikawa | B60L 3/0046 701/22 |
| 8,779,719 | B2 * | 7/2014 | Matsuki | B60L 3/0023 320/109 |
| 8,878,488 | B2 * | 11/2014 | Ono | H01M 10/44 320/109 |
| 8,952,564 | B2 * | 2/2015 | Kamichi | B60L 3/003 307/10.1 |
| 8,988,042 | B2 * | 3/2015 | Kamaga | B60L 53/65 320/109 |
| 9,013,168 | B2 * | 4/2015 | King | H02J 1/102 323/299 |
| 9,020,648 | B2 * | 4/2015 | Doljack | H02J 9/005 700/286 |
| 9,043,081 | B2 * | 5/2015 | Yoshikawa | B60L 1/00 701/36 |
| 9,048,050 | B2 * | 6/2015 | Kurita | H01H 47/02 |
| 9,132,739 | B2 * | 9/2015 | Niizuma | B60L 53/30 |
| 9,136,783 | B2 * | 9/2015 | Mitsutani | B60L 15/00 |
| 9,180,781 | B2 * | 11/2015 | Tajima | B60L 58/20 |
| 9,216,655 | B2 * | 12/2015 | Ishii | B60L 3/00 |
| 9,257,867 | B2 * | 2/2016 | Masuda | H02J 7/04 |
| 9,315,112 | B2 * | 4/2016 | Sugiyama | B60L 1/00 |
| 9,337,681 | B2 * | 5/2016 | Sugiyama | H02J 7/1423 |
| 9,352,662 | B2 * | 5/2016 | Kaneyasu | B60L 11/1824 |
| 9,379,564 | B2 * | 6/2016 | Kamishima | B60L 3/04 |
| 9,409,487 | B2 * | 8/2016 | Shao | B60L 11/1811 |
| 9,467,001 | B2 * | 10/2016 | Kinomura | H02J 7/0027 |
| 9,663,098 | B2 * | 5/2017 | Kodawara | B60L 58/26 |
| 9,696,743 | B1 * | 7/2017 | Treichler | G05F 3/02 |
| 9,834,104 | B2 * | 12/2017 | Tsukamoto | H02J 5/005 |
| 9,834,109 | B2 * | 12/2017 | Kosetsu | B60L 58/12 |
| 9,840,153 | B2 * | 12/2017 | Tsukamoto | B60L 3/0069 |
| 9,917,472 | B2 * | 3/2018 | Baek | B60L 53/65 |
| 9,941,710 | B2 * | 4/2018 | Clay | H02J 7/0013 |
| 9,973,035 | B2 * | 5/2018 | Nakagawa | H02J 7/0004 |
| 10,005,369 | B2 * | 6/2018 | Tsukamoto | B60L 53/305 |
| 10,005,371 | B2 * | 6/2018 | Reineccius | B60L 11/1846 |
| 10,017,058 | B2 * | 7/2018 | Nomura | H02M 7/44 |
| 10,040,363 | B2 * | 8/2018 | Beaston | B60L 11/1838 |
| 10,131,231 | B2 * | 11/2018 | Nakagawa | H04B 3/00 |
| 10,139,848 | B1 * | 11/2018 | Treichler | G05F 3/02 |
| 10,176,539 | B2 * | 1/2019 | Yamaguchi | G06Q 50/06 |
| 10,179,514 | B2 * | 1/2019 | Murata | H02J 7/047 |
| 10,183,586 | B1 * | 1/2019 | Appelbaum | B60L 1/00 |
| 10,259,336 | B2 * | 4/2019 | McQuillen | B60L 53/63 |
| 10,328,809 | B2 * | 6/2019 | Masuda | B60L 53/16 |
| 10,343,540 | B2 * | 7/2019 | Tsukamoto | H02J 5/005 |
| 10,368,312 | B2 * | 7/2019 | Li | H04W 52/0258 |
| 2009/0242291 | A1 | 10/2009 | Sagawa et al. | |
| 2009/0301801 | A1 * | 12/2009 | Fujitake | B60L 3/0046 180/65.29 |
| 2010/0079105 | A1 * | 4/2010 | Iwanaga | B60L 53/18 320/109 |
| 2010/0318250 | A1 * | 12/2010 | Mitsutani | B60K 1/02 701/22 |
| 2011/0057611 | A1 * | 3/2011 | Nakaso | B60L 50/16 320/109 |
| 2011/0121780 | A1 * | 5/2011 | Fukuo | B60L 3/0069 320/109 |
| 2011/0175569 | A1 * | 7/2011 | Austin | H01M 10/44 320/109 |
| 2011/0193532 | A1 * | 8/2011 | Iwanaga | H02J 7/02 320/163 |
| 2011/0210698 | A1 * | 9/2011 | Sakai | H02J 7/041 320/109 |
| 2012/0091954 | A1 * | 4/2012 | Matsuki | B60L 3/0023 320/109 |
| 2012/0091958 | A1 * | 4/2012 | Ichikawa | B60L 3/0046 320/109 |
| 2012/0161698 | A1 * | 6/2012 | Anderson | H02J 7/0077 320/109 |
| 2012/0265459 | A1 * | 10/2012 | Sfaelos | B60L 53/305 702/61 |
| 2012/0274277 | A1 * | 11/2012 | Masuda | H02J 7/04 320/109 |
| 2013/0088200 | A1 * | 4/2013 | Kamishima | B60L 3/04 320/109 |

(56) References Cited

U.S. PATENT DOCUMENTS

| | | | |
|---|---|---|---|
| 2013/0099740 A1* | 4/2013 | Takashima | B60L 11/1816 320/109 |
| 2013/0106350 A1* | 5/2013 | Ono | H01M 10/44 320/109 |
| 2013/0116875 A1* | 5/2013 | Oh | B60L 15/2045 701/22 |
| 2013/0265005 A1* | 10/2013 | Kurita | H01H 47/02 320/109 |
| 2014/0035530 A1* | 2/2014 | Shao | B60L 11/1811 320/109 |
| 2014/0084818 A1* | 3/2014 | Sugiyama | H02J 7/1423 318/139 |
| 2014/0132226 A1* | 5/2014 | Sakamoto | B60L 3/0046 320/166 |
| 2014/0167691 A1* | 6/2014 | Kamaga | B60L 3/0069 320/109 |
| 2014/0191720 A1* | 7/2014 | Sugiyama | B60L 3/0069 320/109 |
| 2014/0197790 A1* | 7/2014 | Kaneyasu | B60L 11/1824 320/109 |
| 2014/0217972 A1* | 8/2014 | Ishii | B60L 3/00 320/109 |
| 2014/0239894 A1* | 8/2014 | Mitsutani | H02J 7/04 320/109 |
| 2014/0257614 A1* | 9/2014 | Niizuma | B60L 53/30 701/22 |
| 2014/0368211 A1* | 12/2014 | Inoue | B60L 50/66 324/509 |
| 2015/0130423 A1* | 5/2015 | Tajima | B60L 58/20 320/137 |
| 2015/0258908 A1* | 9/2015 | Fukui | B60L 3/00 320/162 |
| 2015/0298569 A1* | 10/2015 | Kosetsu | B60L 58/12 320/155 |
| 2015/0326050 A1* | 11/2015 | Baek | B60L 58/12 320/137 |
| 2016/0046194 A1* | 2/2016 | Tsukamoto | H02J 5/005 307/104 |
| 2016/0185248 A1* | 6/2016 | Aoshima | B60L 3/00 701/22 |
| 2016/0193932 A1* | 7/2016 | Vaghefinazari | H02J 7/0021 320/109 |
| 2016/0280077 A1* | 9/2016 | Tsukamoto | B60L 3/0069 |
| 2016/0288665 A1* | 10/2016 | Tsukamoto | H02J 5/005 |
| 2016/0297312 A1* | 10/2016 | Tsukamoto | H02J 50/10 |
| 2017/0093211 A1* | 3/2017 | Nakagawa | H02J 7/0004 |
| 2018/0147948 A1* | 5/2018 | Ohiwa | H02J 7/0027 |
| 2018/0186241 A1* | 7/2018 | Harvey | B60L 3/04 |
| 2018/0194238 A1* | 7/2018 | Tsuchiya | B60L 11/184 |
| 2018/0236888 A1* | 8/2018 | Yabuuchi | B60L 3/0069 |
| 2019/0232788 A1* | 8/2019 | Kimura | B60L 1/02 |

* cited by examiner

VEHICLE-MOUNTED CHARGING SYSTEM

CROSS-REFERENCE TO RELATED APPLICATIONS

This application is the U.S. national stage of PCT/JP2016/071889 filed Jul. 26, 2016, which claims priority of Japanese Patent Application No. JP 2015-155424 filed Aug. 5, 2015.

TECHNICAL FIELD

The present invention relates to a vehicle-mounted charging system for performing control to charge a battery in a vehicle with power supplied from a charging apparatus that is installed in a charging station or the like.

BACKGROUND

Plug-in hybrid electric vehicles (PHEV), which use both electric motors and engines, and electric vehicles (EV), which do not have engines and are driven by electric motors, are coming into wide use. Vehicles such as plug-in hybrid electric vehicles and electric vehicles have batteries for storing power to drive the electric motors, and the batteries are charged using external charging stations.

Methods for charging batteries for driving motors include AC charging and DC charging. DC charging methods include CHAdeMO and CCS (Combined Charging System; also called Combo). A charging station conforming to CHAdeMO has a DC charging connector, and communicates with the vehicle through a CAN (Controller Area Network). Meanwhile, a charging station conforming to Combo has a DC charging connector and an AC charging connector, checks connection to a vehicle, completion of charging preparation, the charging state, and the like using control pilot (CPLT) signals that are transmitted and received through a communication line, and controls power supply. This charging station also performs PLC communication, in which other control signals are superimposed on the control pilot signals, to transmit and receive various kinds of information associated with charging to and from the vehicle and the charging station.

Since there are two DC charging methods, if the method employed by the charging station does not match the method employed by the vehicle, a situation where charging cannot be performed may occur. JP 2014-124034A and JP 2014-124033A disclose relay devices that convert and relay the type of control signals associated with charging between a vehicle and a charging station that conform to different DC charging methods, thereby realizing battery charging using the charging station with a different charging method at a low cost.

However, although the relay devices according to Patent Documents 1 and 2 enable control signals to be normally transmitted and received between the vehicle and the charging station, these relay devices cannot prevent the occurrence of an abnormal current such as a reverse current or rush current caused by a potential difference between a battery voltage and a DC voltage output by the charging station.

The present invention has been made in view of the foregoing situation, and aims to provide a vehicle-mounted charging system that enables a vehicle battery to be charged and prevent an abnormal current from occurring between the vehicle and a charging station, regardless of which charging method is employed by the charging station.

SUMMARY

A vehicle-mounted charging system according to the present invention is a vehicle-mounted charging system to be mounted in a vehicle provided with a first connector, to which a charging cable of a first charging apparatus that performs charging in accordance with a first charging method is to be connected, and a second connector, to which a charging cable of a second charging apparatus that performs charging in accordance with a second charging method is to be connected, the vehicle-mounted charging system for charging a battery in the vehicle with power supplied from the first charging apparatus or the second charging apparatus, including: a first relay for switching between connection and disconnection of power supply paths from the first connector and the second connector to the battery, the first relay being provided on the power supply paths; a charging controller for communicating with the first charging apparatus via a charging cable connected to the first connector, and turning on the first relay in accordance with the first charging method to charge the battery; a charging method determiner for determining whether the battery is to be charged in accordance with the first charging method or the second charging method; a relayer for communicating with the second charging apparatus via a charging cable connected to the second connector and also communicating with the charging controller to relay communication between the second charging apparatus and the charging controller, if the charging method determiner determines that charging is to be performed in accordance with the second charging method; and a delay controller for performing control to delay a timing at which the charging controller turns on the first relay, if the charging method determiner determines that charging is to be performed in accordance with the second charging method.

The vehicle-mounted charging system according to the present invention further includes a second relay for switching between connection and disconnection of a control signal transmission path from the charging controller to the first relay, the second relay being provided on the control signal transmission path, wherein the delay controller controls turning on and off of the second relay.

In the vehicle-mounted charging system according to the present invention, the delay controller keeps the second relay in an ON state if the charging method determiner determines that charging is to be performed in accordance with the first charging method, and sets the second relay to an OFF state and thereafter switches the second relay to an ON state at a timing later than a timing at which the charging controller outputs a signal to turn on the first relay, if the charging method determiner determines that charging is to be performed in accordance with the second charging method.

The vehicle-mounted charging system according to the present invention further includes: a first connection detector for detecting connection of a charging cable to the first connector; and a second connection detector for detecting connection of a charging cable to the second connector, wherein the charging method determiner performs the determination based on a detection result from the first connection detector and a detection result from the second connection detector.

The vehicle-mounted charging system according to the present invention further includes a connection prohibitor for prohibiting, if a charging cable is connected to one of the first connector and the second connector, a charging cable from being connected to the other one of the first connector and the second connector.

A vehicle-mounted charging system according to the present invention is a vehicle-mounted charging system to be mounted in a vehicle provided with a first connector, to which a charging cable of a first charging apparatus that performs charging in accordance with a first charging method is to be connected, and a second connector, to which a charging cable of a second charging apparatus that performs charging in accordance with a second charging method is to be connected, the vehicle-mounted charging system for charging a battery in the vehicle with power supplied from the first charging apparatus or the second charging apparatus, including: a first relay for switching between connection and disconnection of power supply paths from the first connector and the second connector to the battery, the first relay being provided on the power supply paths; a charging controller for communicating with the first charging apparatus via a charging cable connected to the first connector, and turning on the first relay in accordance with the first charging method to charge the battery; a charging method determiner for determining whether the battery is to be charged in accordance with the first charging method or the second charging method; a relayer for communicating with the second charging apparatus via a charging cable connected to the second connector and also communicating with the charging controller to relay communication between the second charging apparatus and the charging controller, if the charging method determiner determines that charging is to be performed in accordance with the second charging method; and a backflow preventer for preventing backflow of a current from the battery to the first connector and the second connector, the backflow preventer being provided on the power supply paths from the first connector and the second connector to the battery.

In the vehicle-mounted charging system according to the present invention, the first charging method is CHAdeMO, and the second charging method is CCS (Combined Charging System).

According to the present invention, the vehicle is provided with the first connector to which the charging cable for performing charging in accordance with the first charging method is to be connected and the second connector to which the charging cable for performing charging using the second charging method is to be connected. With this configuration, both charging apparatuses that employ the first charging method and the second charging method can supply power by connecting the charging cables to the first connector or the second connector in the vehicle. The vehicle-mounted charging system includes the charging controller for controlling charging of the battery in accordance with the first charging method. The charging controller communicates with the first charging apparatus via the charging cable connected to the first connector, and charges the battery by turning on the first relay, which is provided on the power supply path from the first connector to the battery. Thus, the battery in the vehicle can be charged using the first charging apparatus that employs the first charging method.

In the vehicle-mounted charging system, if it is determined that charging is to be performed in accordance with the second charging method, the relayer relays communication between the second charging apparatus and the aforementioned charging controller. The relayer can perform processing for converting information that is transmitted and received through communication according to the first charging method and information that is transmitted and received through communication according to the second charging method to each other. Furthermore, in the vehicle-mounted charging system, the timing of connecting the power supply path differs between the first charging method and the second charging method. For this reason, when charging is performed in accordance with the second charging method, control is performed to delay the timing of actually turning on the first relay relative to the timing at which the charging controller turns on the first relay. Thus, the charging controller, which originally performs charging control in accordance with the first charging method, can communicate, via the relayer, with the second charging apparatus that conforms to the second charging method, and can start power supply to the battery at a timing appropriate for the second charging method.

Accordingly, the vehicle-mounted charging system can charge the battery in the vehicle regardless of whether the first charging method or the second charging method is employed by a charging apparatus.

A control signal for switching between ON and OFF is given from the charging controller to the first relay, and the control signal transmission path for transmitting the control signal is provided from the charging controller to the first relay. According to the present invention, the second relay for switching between connection and disconnection of this control signal transmission path is provided, and control is performed to delay the timing of starting power supply to the battery, by controlling the turning on and off of the second relay. That is to say, the second relay is kept in an OFF state even if the charging controller outputs a control signal for turning on the first relay. Thus, the first relay can be kept in an OFF state without being turned on. (However, it is assumed that the first relay stays in an OFF state in a state where the control signal is not given from the charging controller.)

According to the present invention, if it is determined that charging is to be performed in accordance with the first charging method, the second relay is kept in an ON state. As a result, the first relay is switched between ON and OFF in accordance with the control signal given from the charging controller, and the battery can be charged in accordance with the first charging method by the charging controller. On the other hand, if it is determined that charging is to be performed using the second charging method, the second relay is set to an OFF state, and is thereafter set to an ON state at a timing that is later than the timing at which the charging controller outputs the signal for turning on the first relay. Thus, when the second relay is set to an ON state, a control signal from the charging controller is transmitted to the first relay, and the first relay enters an ON state. Accordingly, if charging is performed using the second charging method, the first relay can be turned on at a timing that is later than in the case of the first charging method, and power supply to the battery can be started at a timing appropriate for the second charging method.

According to the present invention, connection of a charging cable to the first connector and connection of a charging cable to the second connector are detected, and it is determined based on the results of this detection whether to perform charging in accordance with the first charging method or to perform charging in accordance with the second charging method. Thus, the vehicle-mounted charging system can readily and reliably select the charging method to charge the battery.

According to the present invention, if a charging cable is connected to one of the first connector and the second connector, a charging cable is prohibited from being connected to the other one of the first connector and the second connector. For example, if the first connector and the second connector are arranged next to each other in the vehicle, prohibition of the connection can be realized by providing a cover that slides to a position at which the cover covers and hides one of the first connector and the second connector, for example. This cover exposes the second connector when covering and hiding the first connector, can be slid from a position at which the cover covers and hides the first connector to a position at which the cover covers and hides the second connects, and exposes the first connector when covering and hiding the second connector. The size of the cover, the positions to which the cover is slid, and the like are determined so that the first connector and the second connector are not in an exposed state at the same time. Thus, charging cables can be prevented from being connected to the first connector and the second connector at the same time.

According to the present invention, the backflow preventer is provided on the power supply paths from the first connector and the second connector to the battery, in place of the above-described configuration in which the control is performed to delay the timing of turning on the first relay. With this configuration, when charging is performed using the second charging method, backflow of a current from the battery to the charging apparatus can be prevented even if the first relay is connected at a timing (timing of starting power supply in accordance with the first charging method) that is earlier than the timing of starting power supply in accordance with the second charging method.

According to the present invention, CHAdeMO is employed as the first charging method, and CCS is employed as the second charging method. In CCS, the timing of turning on the first relay is later than that in CHAdeMO, and accordingly these methods are preferable for the above-described configuration.

Advantageous Effects of Invention

According to the present invention, the relayer relays communication between the charging controller that performs charging control in accordance with the first charging method and the second charging apparatus that performs charging in accordance with the second charging method, and control is performed to delay the timing of turning on the first relay provided on the power supply paths from the first connector and the second connector to the battery, or the backflow preventer is provided on these power supply paths. Thus, regardless of which method is employed by the charging apparatus, the battery in the vehicle can be charged, and an abnormal current can be prevented from occurring between the vehicle and the charging apparatus.

DETAILED DESCRIPTION OF PREFERRED EMBODIMENTS

Embodiment 1

Figure 1:
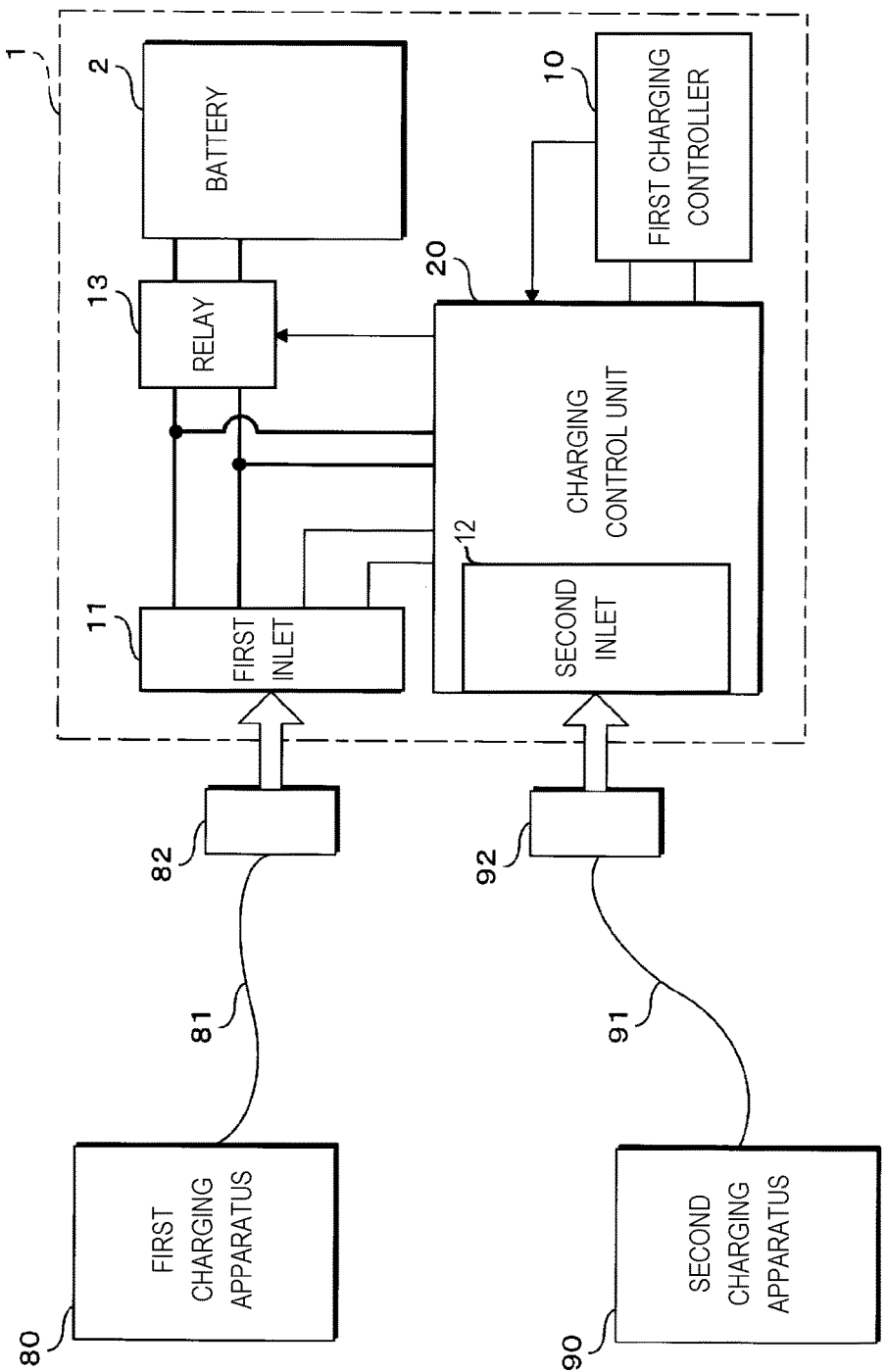
FIG. 1 is a schematic diagram illustrating an overview of a vehicle-mounted charging system according to the embodiments.
Figure 2:
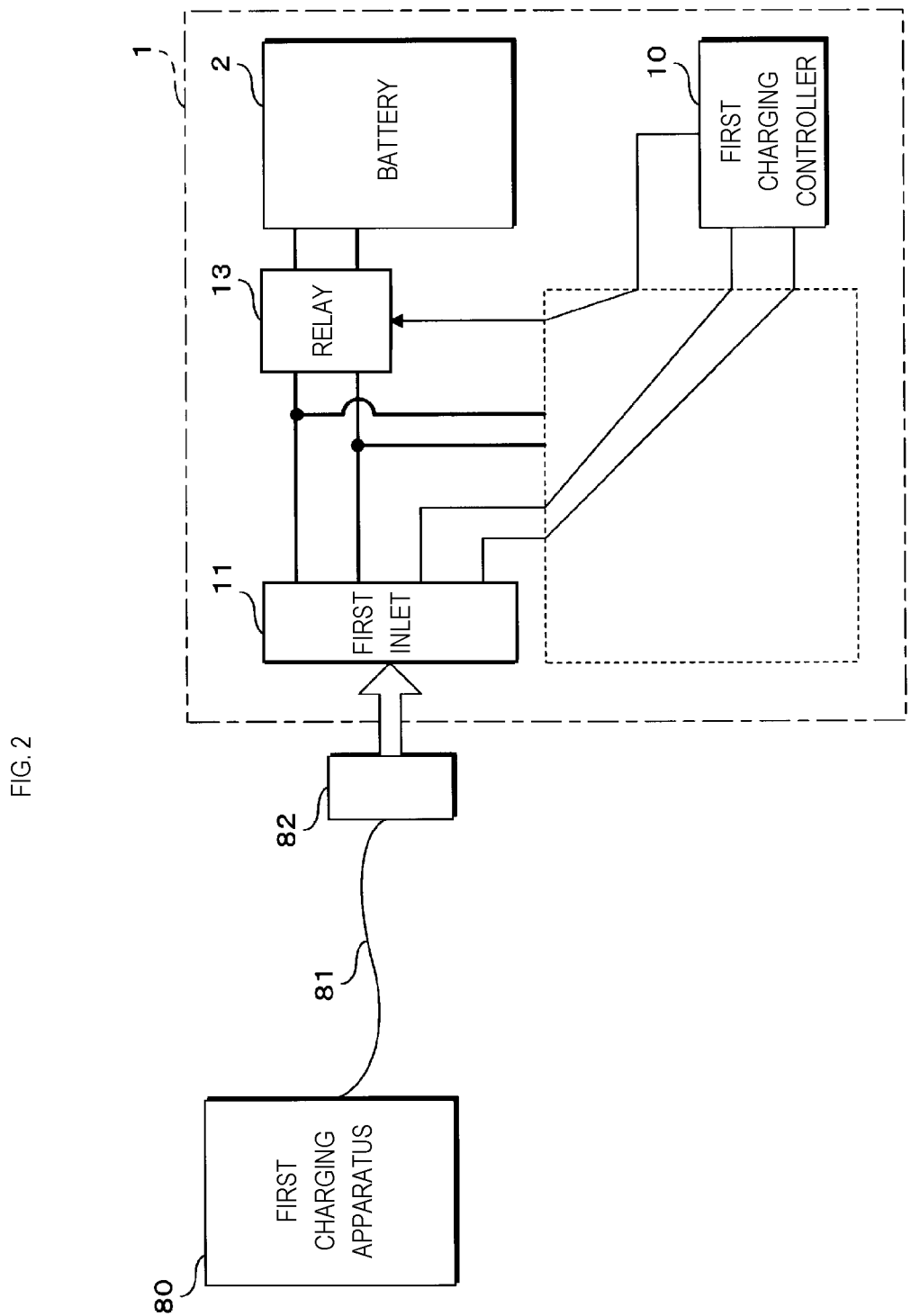
FIG. 2 is a schematic diagram illustrating an overview of the vehicle-mounted charging system according to the embodiments.

Hereinafter, the present invention will be described in detail based on the drawings showing the embodiments thereof. FIGS. 1 and 2 are schematic diagrams illustrating an overview of the vehicle-mounted charging system according to Embodiment 1. The vehicle-mounted charging system according to this embodiment is a system for charging a battery 2, which is mounted in a vehicle 1, such as an electric vehicle or a plug-in hybrid electric vehicle, by supplying a DC voltage from a first charging apparatus 80 or a second charging apparatus 90 that is installed in a charging station or the like, via a charging cable 81 or 91.

In this embodiment, the first charging apparatus 80 is a charging apparatus that employs a first charging method (e.g. CHAdeMO), and the second charging apparatus 90 is a charging apparatus that employs a second charging method (e.g. CSS). Since the first charging apparatus 80 and the second charging apparatus 90 employ different charging methods, the charging cables 81 and 91 that are provided in the respective charging apparatuses have different shaped leading end portions, namely charging guns 82 and 92. In this regard, the vehicle 1 according to this embodiment includes a first inlet 11, to which the charging gun 82 of the first charging apparatus 80 can be connected, and a second inlet 12, to which the charging gun 92 of the second charging apparatus 90 can be connected. Accordingly, the vehicle 1 can use both the first charging apparatus 80 and the second charging apparatus 90, which use different charging methods, to charge the battery 2. However, the charging gun 82 or 92 can be connected to either one of the first inlet 11 and the second inlet 12 of the vehicle 1, and the two charging guns 82 or 92 cannot be connected at the same time. That is to say, the battery 2 in the vehicle 1 cannot be charged by using two charging apparatuses, namely the first charging apparatus 80 and the second charging apparatus 90 at the same time.

The vehicle 1 according to this embodiment basically has a function of charging the battery 2 in accordance with the first charging method, and the charging function according to the second charging method is added as an option or the like. FIG. 1 shows a configuration of the vehicle 1 equipped with the charging function according to the second charging method, and FIG. 2 shows a configuration of the vehicle 1 that is not equipped with the charging function according to the second charging method. To charge the battery 2 in accordance with the first charging method, the vehicle 1 includes the first inlet 11 to which the charging gun 82 of the first charging apparatus 80 can be connected, a DC cutoff relay 13, which is arranged on power supply paths from the first inlet 11 to the battery 2, and a first charging controller 10, which communicates with the first charging apparatus 80 that conforms to the first charging method and controls switching between ON and OFF of the DC cutoff relay 13, for example, to control the charging of the battery 2, as shown in FIG. 2. The first charging controller 10 is constituted by a microcomputer including a CPU (Central processing unit), a ROM (Read Only Memory), a RAM (Random Access Memory), and the like, for example. When the charging gun 82 is connected to the first inlet 11, the first charging controller 10 charges the battery 2 by communicating with the first charging apparatus 80 via the charging cable 81 to give and receive information defined by the first charging method, and thereafter switching the DC cutoff relay 13 to an ON state at an appropriate timing.

The charging of the battery 2 using the second charging method is realized by attaching a charging control unit 20 to, for example, a unit attachment portion that is provided at a predetermined position in the vehicle 1. The charging control unit 20 includes the second inlet 12 to which the charging gun 92 of the second charging apparatus 90 can be connected. The charging control unit 20, when attached to the vehicle 1, is provided so as to be present in the middle of a communication line from the first inlet 11 to the first charging controller 10 and in the middle of a signal line from the first charging controller 10 to the DC cutoff relay 13. The charging control unit 20 is connected to branches from the power supply paths from the first inlet 11 to the DC cutoff relay 13, and supplies power from the second charging apparatus 90 that is supplied via the charging cable 91 connected to the second inlet 12, to the battery 2 via the DC cutoff relay 13.

When the battery 2 is charged using the first charging apparatus 80 in accordance with the first charging method, the charging control unit 20 behaves as if it does not exist to the first charging controller 10, thereby causing the first charging controller 10 to perform control in accordance with the first charging method. That is to say, the charging control unit 20 passes signals transmitted and received between the first inlet 11 and the first charging controller 10 and signals given and received between the first charging controller 10 and the DC cutoff relay 13 as-is.

When the battery 2 is charged using the second charging apparatus 90 in accordance with the second charging method, the charging control unit 20 communicates with the second charging apparatus 90 in accordance with the second charging method, and also communicates with the first charging controller 10 in accordance with the first charging method. The charging control unit 20 converts information received from the second charging apparatus 90 and conforms to the second charging method to information that conforms to the first charging method, and gives the resulting information to the first charging controller 10. The charging control unit 20 also converts information received from the first charging controller 10 and conforms to the first charging method to information that conforms to the second charging method, and gives the resulting information to the second charging apparatus 90. As a result of the charging control unit 20 converting information and relaying communication between the second charging apparatus 90 and the first charging controller 10, the first charging controller 10 can communicate with the second charging apparatus 90 that employs the second charging method, in the same manner as communication with a charging apparatus that employs the first charging method.

The charging control unit 20 also relays control signals from the first charging controller 10 to the DC cutoff relay 13. When the battery 2 is charged using the second charging apparatus 90 in accordance with the second charging method, the charging control unit 20 turns on the DC cutoff relay 13 in accordance with the second charging method by delaying the timing of turning on the DC cutoff relay 13 relative to the timing at which the DC cutoff relay 13 is turned on by the first charging controller 10 (i.e. the timing of turning on in accordance with the first charging method). This is control for filling a gap in the timing: namely, in the second charging method such as CSS, the turning on of the DC cutoff relay 13 needs to be withheld until the potentials at both sides of a power line that is cut off by the DC cutoff relay 13 are substantially the same, whereas, in the first charging method such as CHAdeMO, the DC cutoff relay 13 is turned on at a point before the potentials at both sides are substantially the same.

Figure 3:
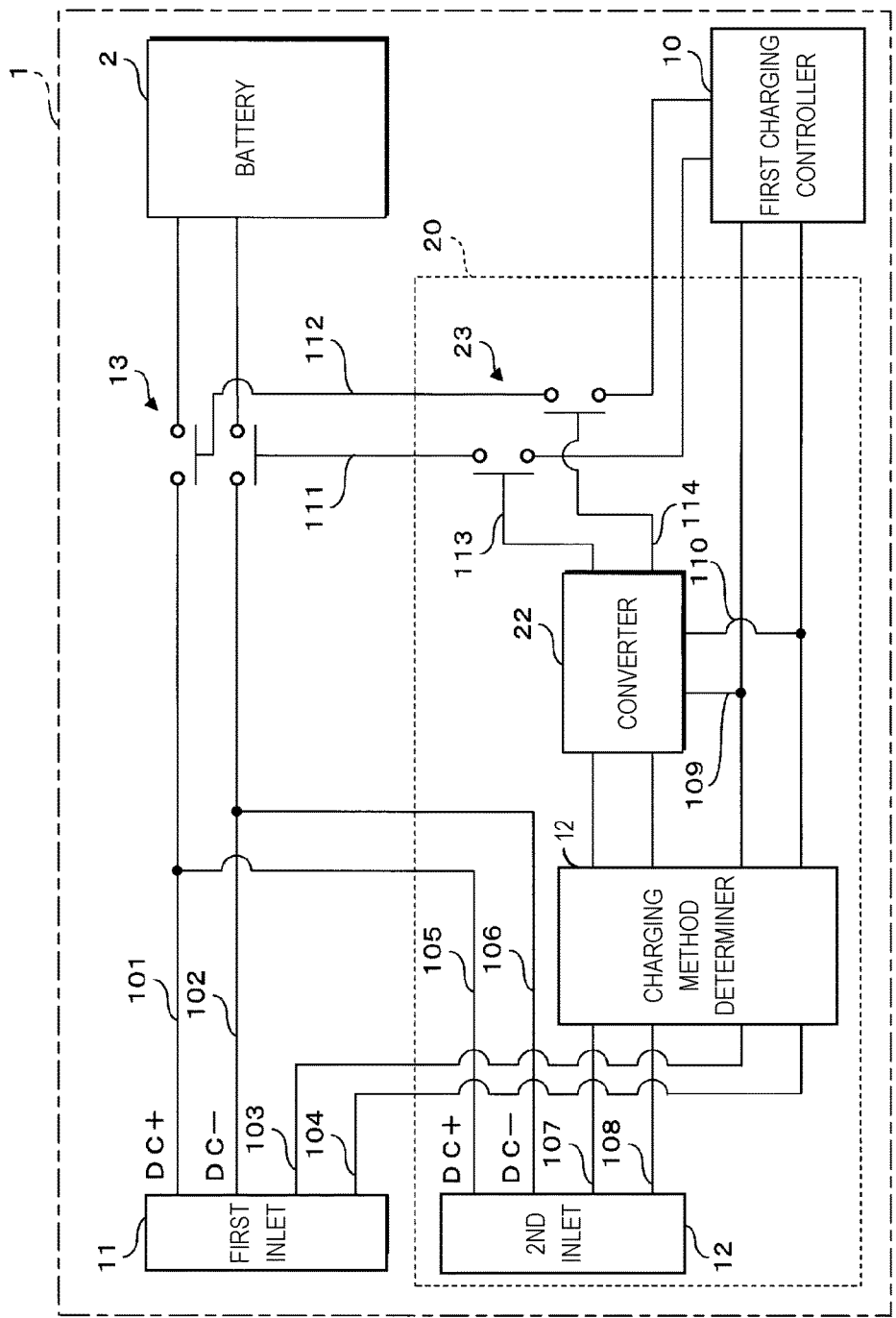
FIG. 3 is a block diagram showing a configuration of the vehicle-mounted charging system according to the embodiments.

FIG. 3 is a block diagram showing a configuration of the vehicle-mounted charging system according to this embodiment. The vehicle-mounted charging system according to this embodiment includes the first charging controller 10, the first inlet 11, the DC cutoff relay 13, the charging control unit 20, and so on. The charging control unit 20 includes the second inlet 12, a charging method determiner 21, a converter 22, a signal cutoff relay 23, and so on.

The charging gun 82, which is provided at a leading end of the charging cable 81 of the first charging apparatus 80 that employs the first charging method, is connected to the first inlet 11. Although not shown in the diagrams, the charging cable 81 includes two power supply lines and one or more signal lines, for example. The power supply lines are lead wires to which a DC voltage output from the charging apparatus 80 is applied. The signal line(s) is a lead wire(s) for transmitting control signals for controlling the charging of the battery 2 mounted in the vehicle 1. If the charging gun 82 is connected to the first inlet 11, the two power supply lines in the charging cable 81 are electrically connected to two power supply lines 101 and 102 in the vehicle 1. The first inlet 11 is connected to the battery 2 via the two power supply lines 101 and 102, and the DC cutoff relay 13 is provided in the middle thereof. That is to say, the first inlet 11 and the battery 2 are connected to each other by two power supply paths, namely a DC+ power supply path and a DC− power supply path, with the DC cutoff relay 13 provided in the middle, and the power supply paths between the first inlet 11 and the battery 2 are connected and disconnected by turning on and off the DC cutoff relay 13.

Also, if the charging gun 82 is connected to the first inlet 11, the one or more signal lines in the charging cable 81 are electrically connected to one or more signal lines 103 and 104 in the vehicle 1 (in FIG. 3, only two signal lines 103 and 104 are shown for simplification). The signal lines 103 and 104 are connected to the first charging controller 10 through the charging method determiner 21 in the charging control unit 20. The signal lines 103 and 104 are branched in the middle, and branched signal lines 109 and 110 are connected to the converter 22 in the charging control unit 20. Thus, the converter 22 can monitor signals given and received between the first inlet 11 and the first charging controller 10, and can output signals to the signal line 103 and 104 when necessary. The one or more signal lines 103 and 104 may include a communication line (CAN bus) for communicating with the first charging apparatus 80, a signal line for transmitting a signal related to detection of connection of the charging gun 82 to the first inlet 11, a signal line for transmitting a control signal for locking the charging gun 82 connected to the first inlet 11, or the like, for example. In the case of CHAdeMO, the signal lines 103 and 104 include a signal line for transmitting an analog signal for giving and receiving information such as charging start/stop-1, charging start/stop-2, connector connection check, and charging permission/prohibition.

The charging gun 92, which is provided at a leading end of the charging cable 91 of the second charging apparatus 90 that employs the second charging method, is connected to the second inlet 12 of the charging control unit 20. Although not shown in the diagrams, the charging cable 91 includes two power supply lines and one or more signal lines, for example. If the charging gun 92 is connected to the second inlet 12, the two power supply lines in the charging cable 91 are electrically connected to two power supply lines 105 and 106 in the vehicle 1. One end of the two power supply lines 105 and 106 is connected to the second inlet 12, and the other end is connected to appropriate points on the two power supply lines 101 and 102, respectively, between the first inlet 11 and the DC cutoff relay 13. Thus, the second inlet is connected to the battery 2 via the two power supply lines 105 and 106 and the two power supply lines 101 and 102, and the DC cutoff relay 13 is provided in the middle to connect and disconnect the power supply paths.

Also, if the charging gun 92 is connected to the second inlet 12, one or more signal lines in the charging cable 91 are electrically connected to one or more signal lines 107 and 108 in the charging control unit 20. The signal lines 107 and 108 are connected to the converter 22 through the charging method determiner 21.

The one or more signal lines 107 and 108 may include a communication line (CPLT) for communicating with the second charging apparatus 90, a signal line for transmitting a signal related to detection of connection of the charging gun 92 to the second inlet 12, a signal line for transmitting a control signal for locking the charging gun 92 connected to the second inlet 12, or the like, for example.

The DC cutoff relay 13 is constituted by two electromagnetic relays that are provided respectively in the middle of the two power supply lines 101 and 102 that connect the first inlet 11 to the battery 2. Signal lines 111 and 112 for transmitting control signals for switching between ON and OFF are connected to control terminals of the DC cutoff relay 13. The DC cutoff relay 13 and the first charging controller 10 are connected to each other via the signal lines 111 and 112, and the signal cutoff relay 23 is provided in the middle of these signal lines 111 and 112. The signal cutoff relay 23 is constituted by two electromagnetic relays that are provided in the charging control unit 20 and are provided in the middle of the two signal lines 111 and 112. Control terminals of the signal cutoff relay 23 are connected to the converter 22 via signal lines 113 and 114. That is to say, the signal cutoff relay 23 is provided on control signal transmission paths from the first charging controller 10 to the DC cutoff relay 13, and connection and disconnection of these transmission paths are controlled by the converter 22. Note that the DC cutoff relay 13 and the signal cutoff relay 23 are usually in an OFF state, and enter an ON state only when a control signal for switching to the connected state is given.

Figure 4:
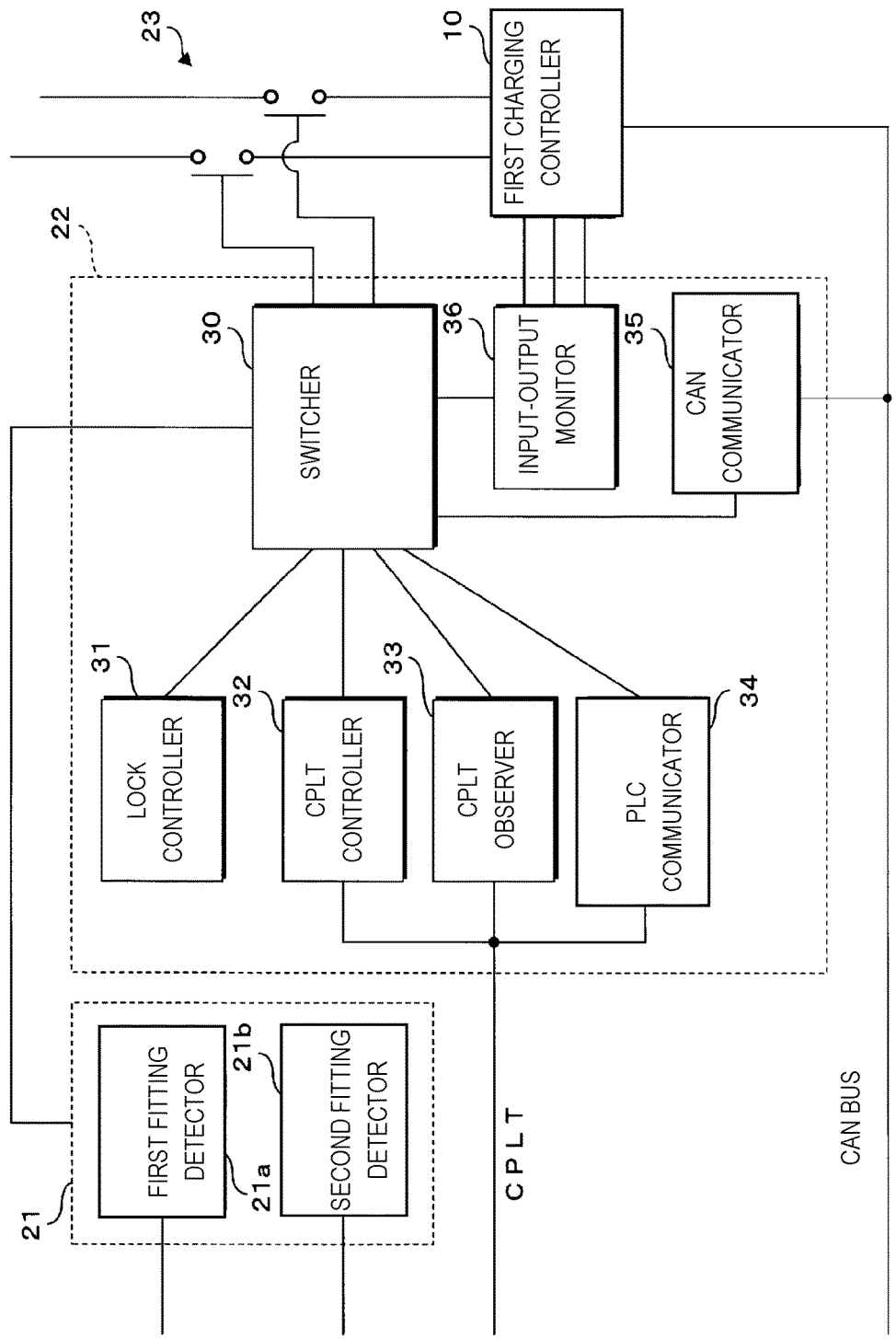
FIG. 4 is a block diagram showing a configuration of a charging method determiner and a converter in a charging control unit.

FIG. 4 is a block diagram showing a configuration of the charging method determiner 21 and the converter 22 in the charging control unit 20. The charging method determiner 21 in the charging control unit 20 includes a first fitting detector 21a and a second fitting detector 21b. The converter 22 includes a switcher 30, a lock controller 31, a CPLT controller 32, a CPLT observer 33, a PLC communicator 34, a CAN communicator 35, an input-output monitor 36, and so on.

The first fitting detector 21a is connected to a signal line for transmitting a signal indicating the connection state of the charging gun 82, of the one or more signal lines 103 and 104 arranged between the first inlet 11 and the first charging controller 10, and detects connection of the charging gun 82 to the first inlet 11 by detecting a change in the state of this signal. The first inlet 11 is provided with a mechanical switch that is pressed when the charging gun 82 is connected, for example, and a signal indicating the state of this switch is transmitted from the first inlet 11 to the first charging controller 10 via the signal line.

Similarly, the second fitting detector 21b is connected to a signal line for transmitting a signal indicating the connection state of the charging gun 92, of the one or more signal lines 107 and 108 arranged between the second inlet 12 and the converter 22, and detects connection of the charging gun 92 to the second inlet 12 by detecting a change in the state of this signal. The second inlet 12 is provided with a mechanical switch that is pressed when the charging gun 92 is connected, for example, and a signal indicating the state of this switch is transmitted from the second inlet 12 to the converter 22 via the signal line.

The charging method determiner 21 determines whether to perform charging in accordance with the first charging method or the second charging method, based on the detection result from the first fitting detector 21a and the detection result from the second fitting detector 21b, and notifies the switcher 30 in the converter 22 of the determination result. If the first fitting detector 21a detects connection of the charging gun 82 to the first inlet 11, the charging method determiner 21 notifies the switcher 30 that charging according to the first charging method is to be performed. If the second fitting detector 21b detects connection of the charging gun 92 to the second inlet 12, the charging method determiner 21 notifies the switcher 30 that the charging according to the second charging method is to be performed. If the charging gun 82 is not connected to the first inlet 11, and the charging gun 92 is not connected to the second inlet 12, the charging method determiner 21 notifies the switcher 30 that the charging is not to be performed.

After the charging gun 92 is connected to the second inlet 12, the lock controller 31 in the converter 22 performs control to lock the charging gun 92 in a state of being connected to the second inlet 12 in order to prevent the charging gun 92 from being removed from the second inlet 12 while the battery 2 is being charged from the second charging apparatus 90. For this purpose, a lock mechanism using an actuator or the like, for example, is provided in the second inlet 12. The signal lines 107 and 108 provided between the second inlet 12 and the converter 22 include a signal line for controlling operations of this actuator, and this signal line is connected to the lock controller 31. The lock controller 31 outputs a control signal for causing the lock mechanism in the second inlet 12 to perform locking or unlocking, in accordance with a command given from the switcher 30. Note that a similar lock mechanism is also provided in the first inlet 11, and this lock mechanism is controlled by the first charging controller 10.

The signal lines 107 and 108 provided between the second inlet 12 and the converter 22 also include a signal line for transmitting CPLT signals that are given and received to and from the second charging apparatus 90. This CPLT signal line is connected to the CPLT controller 32, the CPLT observer 33, and the PLC communicator 34 in the converter 22. A CPLT signal is a control signal that is given and received between the vehicle 1 and the second charging apparatus 90 in accordance with the second charging method, and is a 1 kHz-rectangular wave signal, for example. The CPLT controller 32 controls output and stoppage of the CPLT signal. The CPLT observer 33 measures the potential of the CPLT signal and detects a change in the potential, for example. The CPLT controller 32 and the CPLT observer 33 give and receive, to and from the second charging apparatus 90, information regarding checking of the connection between the second charging apparatus 90 and the vehicle 1, and information regarding charging such as whether or not charging can be performed and the charging state, based on the potential of the rectangular wave signal relative to a reference potential, whether or not the rectangular wave signal has been output, the duty ratio, and the like. For example, the CPLT observer 33 can detect connection to a charging station at which DC charging can be performed, by detecting a CPLT signal with a duty ratio of 5%. The PLC communicator 34 communicates with the second charging apparatus 90 by superimposing a signal of a higher frequency than the CPLT signal, e.g. a signal of 2 to 30 MHz, on the CPLT signal. The PLC communicator 34 transmits and receives the information regarding charging to and from the second charging apparatus 90.

Thus, in the second charging method, the second charging apparatus 90 and the vehicle 1 gives and receives information to and from each other using the CPLT signal and the signal superimposed on the CPLT signal.

In contrast, in the first charging method, communication conforming to a CAN protocol is performed between the first charging apparatus 80 and the vehicle 1. For this purpose, a CAN communication line (CAN bus) is included in the charging cable 81 of the first charging apparatus 80, and a CAN bus is included in the communication lines 103 and 104 provided between the first inlet 11 and the first charging controller 10. Note that, since a differential signal is given and received in the CAN protocol, the actual CAN bus is constituted by two communication lines. However, in FIG. 4, the CAN bus is simplified as one line.

The CAN communicator 35 in the converter 22 is connected to a CAN bus provided between the first inlet 11 and the first charging controller 10, and can communicate with the first charging controller 10 through communication according to the CAN protocol. The CAN communicator 35 transmits and receives information by converting transmission information given from the switcher 30 to an electrical signal and outputting this signal to the CAN bus, and gives reception signals, which are obtained by sampling the potential at the CAN bus, to the switcher 30.

The input-output monitor 36 in the converter 22 monitors signals that are given and received via signal lines other than those of the CAN bus that are provided between the first inlet 11 and the first charging controller 10, e.g. an analog signal line conforming to CHAdeMO, and outputs signals to these signal lines as required. That is to say, when charging is performed in accordance with the second charging method, the input-output monitor 36 exchanges information with the first charging controller 10 by outputting and monitoring signals, such as charging start/stop-1, charging start/stop-2, connector connection check, charging permission/prohibition, and the like, to the analog signal line.

Thus, in the second charging method, the converter 22 communicates with the first charging controller 10 using the CAN communicator 35 via the CAN bus, and using the input-output monitor 36 via the analog signal line. In contrast, in the first charging method, the first charging apparatus 80 and the first charging controller 10 directly communicate with each other via the CAN bus and via the analog signal line.

The switcher 30 in the converter 22 acquires information given from each unit of the converter 22, and switches between communication according to the first charging method and communication according to the second charging method by controlling operations of each portion. The switcher 30 can communicate, in accordance with the second charging method, with the second charging apparatus 90 that is connected to the second inlet 12 via the charging cable 91, through the CPLT controller 32, the CPLT observer 33, and the PLC communicator 34. The switcher 30 can also communicate, in accordance with the first charging method, with the first charging controller 10 through the CAN communicator 35 and the input-output monitor 36. Accordingly, the switcher 30 can convert information that is received from the second charging apparatus 90 through communication according to the second charging method to information suitable for communication according to the first charging method to transmit the converted information to the first charging controller 10, and can convert information that is received from the first charging controller 10 through communication according to the first charging method to information suitable for the second charging method to transmit the converted information to the second charging apparatus 90.

The switcher 30 also performs control to switch between ON and OFF of the signal cutoff relay 23. If the switcher 30 is notified by the charging method determiner 21 that charging is to be performed in accordance with the first charging method, the switcher 30 sets the signal cutoff relay 23 to an on state. As a result, switching between ON and OFF of the DC cutoff relay 13 is performed in accordance with a control signal output by the first charging controller 10. Note that, at this time, the switcher 30 does not perform communication via the CPLT communication lines through the CPLT controller 32, the CPLT observer 33, and the PLC communicator 34, and does not use the CAN communicator 35 to communicate with the first charging controller 10. In this state, the charging of the battery 2 in the vehicle 1 is controlled by the first charging controller 10, and the battery 2 is charged from the first charging apparatus 80 in accordance with the first charging method.

On the other hand, if the switcher 30 is notified by the charging method determiner 21 that charging is to be performed in accordance with the second charging method, the switcher 30 first sets the signal cutoff relay 23 to an OFF state. Thereafter, the switcher 30 performs processing for relaying communication between the second charging apparatus 90 and the first charging controller 10 as mentioned above, and sets the signal cutoff relay 23 to an ON state at a predetermined timing in the course of this processing. Note that, at a timing prior to this, the first charging controller 10 outputs a signal to turn on the DC cutoff relay 13. However, since the signal cutoff relay 23 is in an OFF state, this signal is not transmitted to the DC cutoff relay 13, and the DC cutoff relay 13 is in an OFF state. As a result of the switcher 30 turning on the signal cutoff relay 23, the output signal of the first charging controller 10 is transmitted to the DC cutoff relay 13, and the DC cutoff relay 13 enters an ON state.

Figure 5:
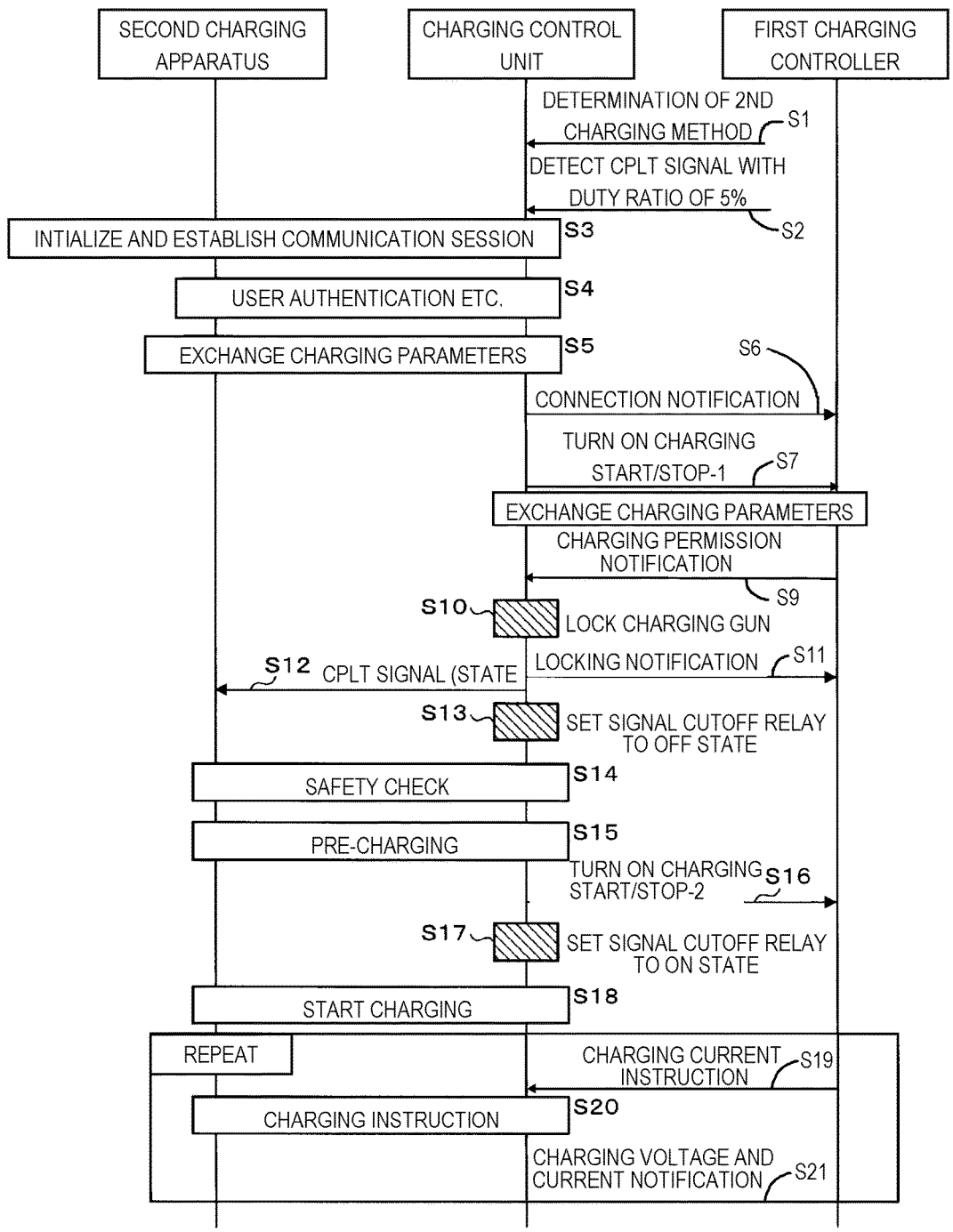
FIG. 5 is a sequence chart illustrating relay processing performed by the charging control unit while charging is performed in accordance with a second charging method.

FIG. 5 is a sequence chart illustrating relay processing performed by the charging control unit 20 during charging according to the second charging method. Relay processing by the charging control unit 20 is started due to the second fitting detector 21b detecting that the charging gun 92 of the second charging apparatus 90 has been connected to the second inlet 12, and the charging method determiner 21 determining that charging is to be performed in accordance with the second charging method (step S1). If the CPLT observer 33 detects a CPLT signal with a duty ratio of 5% (step S2), the second charging apparatus 90 and the charging control unit 20 transmit and receive control signals via the charging cable 91, initialize a communication session, and establish communication (step S3). Note that the voltage level of the CPLT signal at this time is 9 V, and is in a so-called state B. The second charging apparatus 90 and the charging control unit 20 also perform various kinds of processing, such as user authentication (step S4), and exchange parameters required to charge the battery 2 (step S5).

Next, the charging control unit 20 notifies the first charging controller 10 of the connection to a charging apparatus, by causing the input-output monitor 36 to set a connector connection check signal, which is contained in the analog signal line, to an ON state (step S6). The charging control unit 20 also causes the input-output monitor 36 to set a charging start/stop-1 signal, which is contained in the analog signal line, to an ON state (step S7). The first charging controller 10 starts CAN communication upon detecting that the charging start/stop-1 signal has entered an ON state. The CAN communicator 35 in the charging control unit 20 performs CAN communication with the first charging controller 10 and exchanges charging parameters (step S8). If the charging parameters of the second charging apparatus 90 match the battery 2 in the vehicle 1, the first charging controller 10 notifies the charging control unit 20 of charging permission, using a charging permission/prohibition signal in the analog signal line (step S9).

The charging control unit 20 that has been notified of charging permission causes the lock controller 31 to lock the charging gun 92 connected to the second inlet 12 (step S10). The charging control unit 20 notifies the first charging controller 10 that the charging gun 92 has been locked (step S11).

Next, the charging control unit 20 causes the CPLT controller 32 to control the CPLT signal in a state C (step S12). The state C is a state where the voltage level of the CPLT signal is 6 V, and indicates that preparation for charging on the vehicle 1 is complete.

Next, the charging control unit 20 sets the signal cutoff relay 23 to an OFF state (step S13), checks safety with the second charging apparatus 90 (step S14), and performs pre-charging (step S15). If it is confirmed that there is no problem with the results of the safety check and pre-charging, the charging control unit 20 causes the input-output monitor 36 to set a charging start/stop-2 signal, which is contained in the analog signal line, to an ON state (step S16). Thereafter, the charging control unit 20 sets the signal cutoff relay 36 to an ON state (step S17).

The charging control unit 20 then transmits and receives control signals to and from the second charging apparatus 90, and causes the second charging apparatus 90 to start charging the battery 2 (step S18). During the charging, the charging control unit 20 receives, at the CAN communicator 35, a charging current instruction from the first charging controller 10 (step S19). Next, the charging control unit 20 causes the PLC communicator 34 to transmit the received charging current instruction to the second charging apparatus 90, receives notification of a charging voltage and current, and the like transmitted from the second charging apparatus 90 (step S20), and causes the CAN communicator 35 to transmit information regarding the received charging voltage and current, and the like to the first charging controller 10 (step S21). The first charging controller 10, the charging control unit 20, and the second charging apparatus 90 control charging by repeatedly executing processing in steps S19 to S21.

Figure 6:
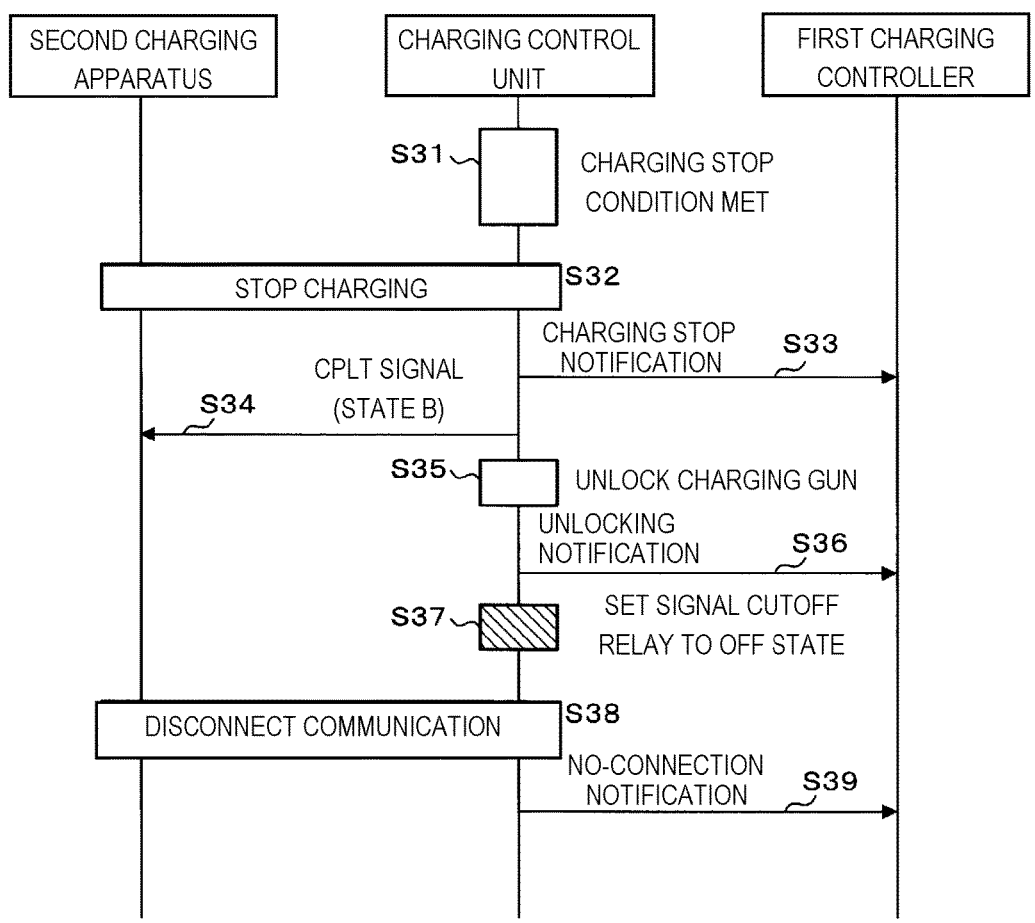
FIG. 6 is a sequence chart illustrating relay processing performed by the charging control unit when the charging according to the second charging method is stopped.

FIG. 6 is a sequence chart illustrating relay processing performed by the charging control unit 20 when stopping the charging according to the second charging method. The charging control unit 20 monitors a charging stop condition during the charging. For example, the charging control unit 20 causes the CAN communicator 35 to monitor a charging stop request that is transmitted from the first charging controller 10, and determines that the charging stop condition is met if the charging stop request has been received from the first charging controller 10. If the charging stop condition is met (step S31), the charging control unit 20 causes the PLC communicator 34 to notify the second charging apparatus 90 that the charging is to be stopped. Upon being notified that the charging is to be stopped, the second charging apparatus 90 stops the supply of the DC current (step S32).

Next, the charging control unit 20 notifies the first charging controller 10 of the stoppage of the charging (step S33), and causes the CPLT controller 32 to control the CPLT signal to be in the state B (step S34). The charging control unit 20 causes the lock controller 31 to unlock the charging gun 92 from the second inlet 12 (step S35), and notifies the first charging controller 10 of the unlocking (step S36).

Next, the charging control unit 20 sets the signal cutoff relay 23 to an OFF state (step S37), executes processing for disconnecting the communication with the second charging apparatus 90 (step S38), and notifies the first charging controller 10 that the charging gun 92 is not connected to the second inlet 12 (step S39).

Figure 7:
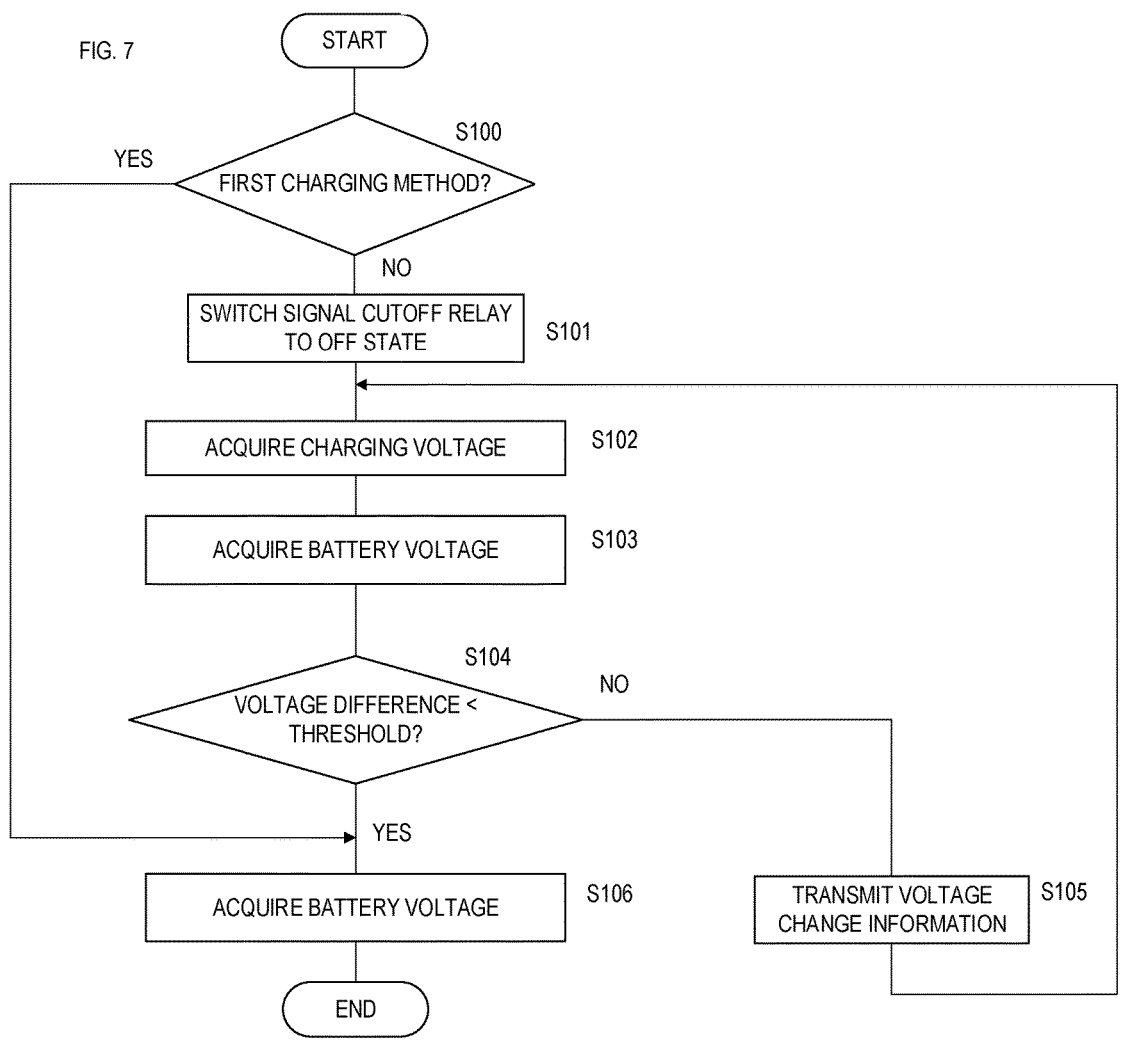
FIG. 7 is a flowchart showing a procedure of processing for controlling a signal cutoff relay performed by the charging control unit.

The battery 2 in the vehicle 1 is charged in accordance with the above processing procedure. Next, a description will be given of a main portion of a processing procedure for switching between ON and OFF of the signal cutoff relay 23 to prevent an occurrence of an abnormal current. FIG. 7 is a flowchart showing a procedure of processing to control the signal cutoff relay 23 performed by the charging control unit 20. Note that, in this processing, the charging control unit 20 needs to acquire a DC current (hereinafter, "charging voltage") that is supplied from the second charging apparatus 90, and a voltage (hereinafter, "battery voltage") across terminals of the battery 2. Although not shown in FIGS. 1 to 3, in this embodiment, the vehicle 1 is provided with a voltmeter for detecting the charging voltage and a voltmeter for detecting the battery voltage. Voltage values detected by these voltmeters are given to the charging control unit 20, the first charging controller 10, and so on.

The switcher 30 in the charging control unit 20 causes the charging method determiner 21 to determine whether or not to perform charging in accordance with the first charging method (step S100). If charging is to be performed in accordance with the first charging method (S100: YES), the switcher 30 outputs a signal to turn on the signal cutoff relay 23, switches the signal cutoff relay 23 to an ON state (step S106), and ends the processing. If charging is to be performed in accordance with the second charging method (S100: NO), the switcher 30 outputs a signal to turn off the signal cutoff relay 23 at a predetermined timing, and switches the signal cutoff relay 23 to an OFF state (step S101). That is to say, the switcher 30 controls the signal cutoff relay 23 to be in an OFF state so that the DC cutoff relay 13 does not enter an ON state, regardless of the control performed by the first charging controller 10, and limits the flow of a current between the second charging apparatus 90 and the battery 2. Note that the aforementioned predetermined timing is not particularly limited as long as it is a timing before a DC voltage is supplied from the second charging apparatus 90 and the control for closing the DC cutoff relay 13 is performed by the first charging controller 10.

Next, the switcher 30 acquires the charging voltage detected by the voltmeter (step S102), and acquires the detected battery voltage (step S103). The switcher 30 then determines whether or not the voltage difference between the DC voltage and the battery voltage acquired in step S102 and step S103, respectively, is smaller than a threshold (step S104). If it is determined that the voltage difference between the charging voltage and the battery voltage is greater than or equal to the threshold (step S104: NO), the switcher 30 causes the PLC communicator 35 to transmit, to the second charging apparatus 90, information for changing the DC voltage supplied by the second charging apparatus 90 (step S105), and returns the processing to step S102. The second charging apparatus 90 receives the information transmitted from the vehicle 1, and changes the voltage value of the DC voltage in accordance with the received information.

If it is determined that the voltage difference between the charging voltage and the battery voltage is smaller than the threshold (step S104: YES), the switcher 30 outputs a signal to turn on the signal cutoff relay 23 and switches the signal cutoff relay 23 to an ON state (step S106), and ends the processing. That is to say, the switcher 30 cancels the limitation of the flow of a current between the second charging apparatus 90 and the battery 2 by controlling the signal cutoff relay 23 to be in an ON state.

Figure 8:
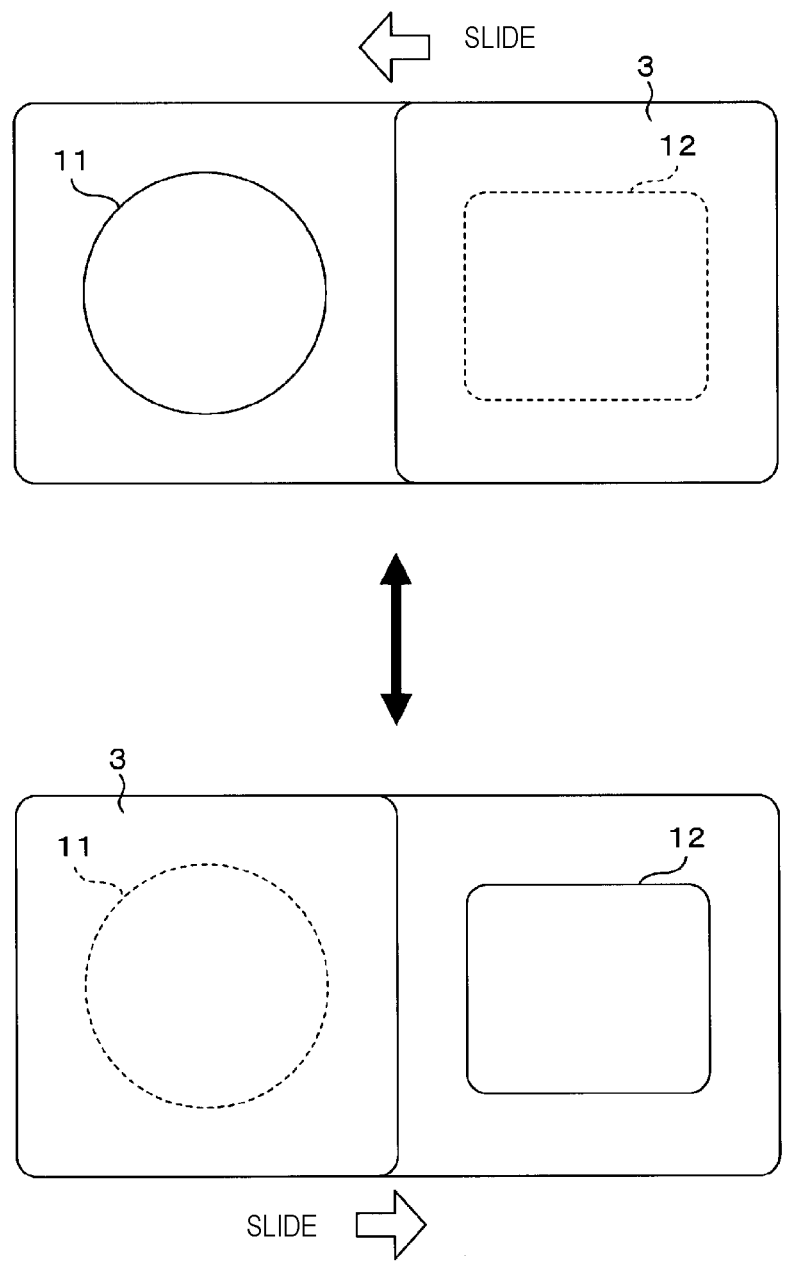
FIG. 8 is a schematic diagram showing a configuration of a charging port provided in a vehicle according to the embodiments.

FIG. 8 is a schematic diagram showing a configuration of the charging port provided in the vehicle 1 according to this embodiment. The battery 2 in the vehicle 1 according to this embodiment can be charged in accordance with two charging methods, namely the first charging method and the second charging method, by equipping the vehicle 1 with the charging control unit 20. When the vehicle 1 is equipped with the charging control unit 20, the first inlet 11 for connecting the charging gun 82 corresponding to the first charging method and the second inlet 12 for connecting the charging gun 92 corresponding to the second charging method are arranged next to each other in the charging port of the vehicle 1.

In the example shown in the diagram, the charging port of the vehicle 1 is provided as a recess having a substantially rectangular opening portion that is elongated in the horizontal direction. The first inlet 11 and the second inlet 12 are arranged next to each other in the longitudinal direction in a bottom portion of this recess. The charging port of the vehicle 1 is provided with a sliding cover 3, which can cover and hide substantially half the opening portion. The sliding cover 3 can be slid in the longitudinal direction of the opening portion. By being slid to an end in the longitudinal direction, the sliding cover 3 covers and hides one of the first inlet 11 and the second inlet 12 that are provided in the charging port, and exposes the other.

Accordingly, the user of the vehicle 1 can slide the sliding cover 3 in accordance with the shape or the like of the charging gun of the charging apparatus to be used, and expose one of the first inlet 11 and the second inlet 12 to connect the charging gun to the exposed inlet. The inlet that is not used at this time is covered and hidden by the sliding cover 3, and is prohibited from being used.

In the vehicle-mounted charging system according to this embodiment having the above-described configuration, the vehicle 1 is provided with the first inlet 11, to which the charging gun 82 of the charging cable 81 for performing charging in accordance with the first charging method, and the second inlet, to which the charging gun 92 of the charging cable 91 for performing charging in accordance with the second charging method. Thus, whichever of the first charging method and the second charging method a charging apparatus employs, the charging cable 81, 91 can be connected to the first inlet 11 or the second inlet 12 of the vehicle 1 to supply power to the battery 2.

The vehicle-mounted charging system according to this embodiment includes the first charging controller 10 for controlling charging of the battery 2 in accordance with the first charging method. The first charging controller 10 communicates with the first charging apparatus 80 via the charging cable 81 that is connected to the first inlet 11, and charges the battery 2 by turning on the DC cutoff relay 13 provided on the power supply paths from the first inlet 11 to the battery 2. Thus, the battery 2 in the vehicle can be charged using the first charging apparatus 80 that employs the first charging method.

In the vehicle-mounted charging system according to this embodiment, if it is determined that charging is to be performed in accordance with the second charging method, the charging control unit 20 relays communication between the second charging apparatus 90 and the first charging controller 10. The charging control unit 20 performs processing for converting information that is transmitted and received through communication according to the first charging method and information that is transmitted and received through communication according to the second charging method to each other. Furthermore, the timing of turning on the DC cutoff relay 13 differs between the first charging method and the second charging method. For this reason, in the vehicle-mounted charging system, when charging is performed in accordance with the second charging method, control is performed to delay the timing of actually turning on the DC cutoff relay 13 relative to the timing at which the first charging controller 10 turns on the DC cutoff relay 13. Thus, the first charging controller 10, which originally performs charging control in accordance with the first charging method, can communicate, via the charging control unit 20, with the second charging apparatus 90 that conforms to the second charging method, and can turn on the DC cutoff relay 13 at a timing appropriate for the second charging method to start power supply to the battery 2.

Accordingly, the vehicle-mounted charging system according to this embodiment can charge the battery 2 in the vehicle 1 with a charging apparatus, regardless of whether this charging apparatus employs the first charging method or the second charging method.

In the vehicle-mounted charging system according to this embodiment, a control signal for switching between ON and OFF is given from the first charging controller 10 to the DC cutoff relay 13, and control signal transmission paths for transmitting the control signal are provided as the signal lines 111 and 112 between the first charging controller 10 to the DC cutoff relay 13. In this embodiment, the signal cutoff relay 23 for switching between connection and disconnection of these control signal transmission paths is provided, and control is performed to delay the timing at which the charging control unit 20 starts power supply to the battery 2, by controlling the turning on and off of the signal cutoff relay 23. That is to say, even if the first charging controller 10 outputs a control signal for turning on the DC cutoff relay 13, the DC cutoff relay 13 can be kept in an OFF state while not turning it on, by keeping the signal cutoff relay 23 in an OFF state.

In the vehicle-mounted charging system according to this embodiment, if the charging method determiner 21 determines that charging is to be performed in accordance with the first charging method, the signal cutoff relay 23 is kept in an ON state. Thus, the DC cutoff relay 13 is switched between ON and OFF in accordance with the control signal given from the first charging controller 10, and the battery 2 can be charged in accordance with the first charging method by the first charging controller 10.

On the other hand, if the charging method determiner 21 determines that charging is to be performed in accordance with the second charging method, the charging control unit 20 turns off the signal cutoff relay 23, and thereafter turns on the signal cutoff relay 23 at a timing that is later than the timing at which the first charging controller 10 outputs the signal for turning on the DC cutoff relay 13. Thus, the control signal from the first charging controller 10 is transmitted to the DC cutoff relay 13 when the signal cutoff relay 23 is turned on, and the DC cutoff relay 13 enters an ON state. Accordingly, when charging is performed in accordance with the second charging method, the DC cutoff relay 13 can be turned on at a timing that is later than in the case of the first charging method, and power supply to the battery 2 can be started at a timing appropriate for the second charging method.

In the vehicle-mounted charging system according to this embodiment, the first fitting detector 21a detects connection of the charging gun 82 of the charging cable 81 to the first inlet 11, and the second fitting detector 21b detects connection of the charging gun 92 of the charging cable 91 to the second inlet 12. Based on the result of this detection, the charging method determiner 21 determines whether to perform charging in accordance with the first charging method or the second charging method. Thus, the vehicle-mounted charging system can readily and reliably select the charging method to charge the battery 2.

In the vehicle-mounted charging system according to this embodiment, if the charging gun 82 or 92 of the charging cable 81 or 91 is connected to one of the first inlet 11 and the second inlet 12, connection to the other inlet is prohibited. For example, the prohibition of the connection can be realized by providing the sliding cover 3 that slides to a position at which the sliding cover 3 covers and hides one of the first inlet 11 and the second inlet 12, in the case where the first inlet 11 and the second inlet 12 are arranged next to each other in the charging port of the vehicle 1. Thus, the charging cables 81 and 91 can be prevented from being connected to the first inlet 11 and the second inlet 12 at the same time. Note that the configuration in which the sliding cover 3 prohibits connection is an example, and any other configuration may also be employed.

In the vehicle-mounted charging system according to this embodiment, CHAdeMO can be employed as the first charging method, and CCS can be employed as the second charging method. Since the timing of turning on the DC cutoff relay 13 in the case of CCS is later than in the case of CHAdeMO, these methods are preferable for the above-described configuration. However, any charging methods other than CHAdeMO and CCS may also be employed as the first charging method and the second charging method.

The vehicle-mounted charging system according to this embodiment has a configuration in which the charging control unit 20 including the second inlet 12, the charging method determiner 21, the converter 22, and the signal cutoff relay 23 can be attached to and detached from the vehicle 1. With this configuration, a function of performing charging in accordance with the second charging method can be readily added to or deleted from the vehicle 1 that employs the first charging method.

Embodiment 2

Figure 9:
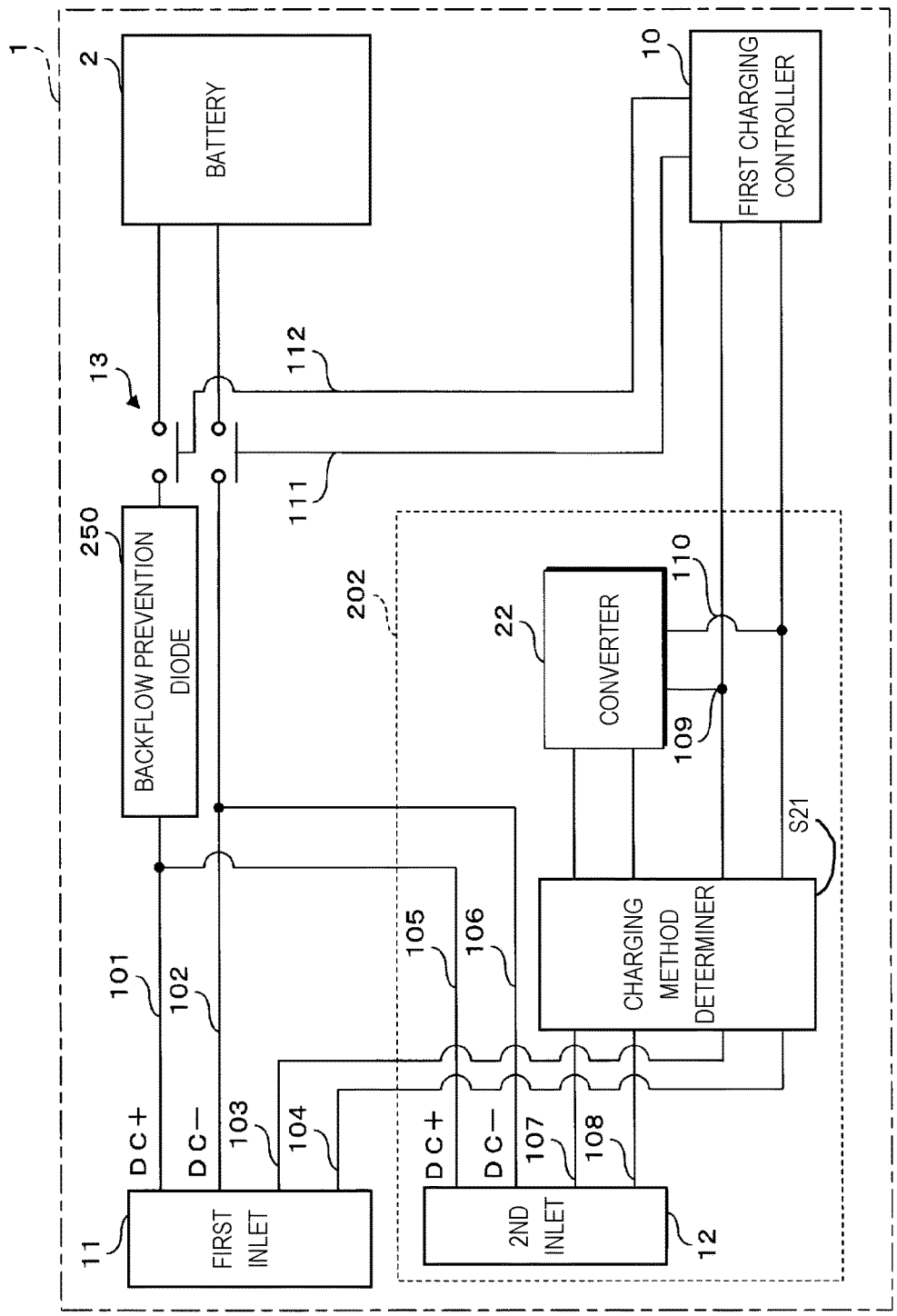
FIG. 9 is a block diagram showing a configuration of a vehicle-mounted charging system according to Embodiment 2.

FIG. 9 is a block diagram showing a configuration of a vehicle-mounted charging system according to Embodiment 2. In the vehicle-mounted charging system according to Embodiment 2, the signal cutoff relay 23 is not provided on the control signal transmission paths from the first charging controller 10 to the DC cutoff relay 13, and the DC cutoff relay 13 is switched between ON and OFF, solely in accordance with the control performed by the first charging controller 10. For this reason, the converter 22 in a charging control unit 202 according to Embodiment 2 does not have the function of controlling the turning on and off of the signal cutoff relay 23.

In the vehicle-mounted charging system according to Embodiment 2, a backflow prevention diode 250 is provided on a power supply path from the first inlet 11 to the battery 2. The backflow prevention diode 250 is provided on the power supply line 101, which corresponds to DC+, of the two power supply lines 101 and 102. The backflow prevention diode 250, which is forwardly connected from the first inlet 11 to the battery 2, allows a current to flow from the first inlet 11 to the battery 2 but does not allow a current to flow from the battery 2 to the first inlet 11.

Accordingly, the vehicle-mounted charging system according to Embodiment 2 has a configuration in which the backflow prevention diode 250 is provided on the power supply path from the first inlet 11 and the second inlet 12 to the battery 2, in place of a configuration in which control is performed to delay the timing of turning on the DC cutoff relay 13 by using the signal cutoff relay 23 according to Embodiment 1. With this configuration, when charging is performed in accordance with the second charging method, even if the DC cutoff relay 13 is turned on at a timing that is earlier than the timing according to the second charging method, backflow of a current from the battery 2 to the second charging apparatus 90 can be prevented.

The invention claimed is:

1. A vehicle-mounted charging system to be mounted in a vehicle provided with a first connector, to which a charging cable of a first charging apparatus that performs charging in accordance with a first charging method is to be connected, and a second connector, to which a charging cable of a second charging apparatus that performs charging in accordance with a second charging method is to be connected, the vehicle-mounted charging system for charging a battery in the vehicle with power supplied from the first charging apparatus or the second charging apparatus, comprising:

a first relay for switching between connection and disconnection of power supply paths from the first connector and the second connector to the battery, the first relay being provided on the power supply paths;

a charging controller for communicating with the first charging apparatus via a charging cable connected to the first connector, and turning on the first relay in accordance with the first charging method to charge the battery;

a charging method determiner for determining whether the battery is to be charged in accordance with the first charging method or the second charging method;

a relayer for communicating with the second charging apparatus via a charging cable connected to the second connector and also communicating with the charging controller to relay communication between the second charging apparatus and the charging controller, if the charging method determiner determines that charging is to be performed in accordance with the second charging method;

a delay controller for performing control to delay a timing at which the charging controller turns on the first relay, if the charging method determiner determines that charging is to be performed in accordance with the second charging method; and a second relay for switching between connection and disconnection of a control signal transmission path from the charging controller to the first relay, the second relay being provided on the control signal transmission path, wherein the delay controller keeps the second relay in an ON state if the charging method determiner determines that charging is to be performed in accordance with the first charging method, and sets the second relay to an OFF state and thereafter switches the second relay to an ON state at a timing later than a timing at which the charging controller outputs a signal to set the first relay to an ON state, if the charging method determiner determines that charging is to be performed in accordance with the second charging method.

2. The vehicle-mounted charging system according to claim 1, wherein the first charging method is CHAdeMO, and the second charging method is CCS (Combined Charging System).

3. The vehicle-mounted charging system according to claim 1, further comprising:

a connection prohibitor for prohibiting, if a charging cable is connected to one of the first connector and the second connector, a charging cable from being connected to the other one of the first connector and the second connector.

4. The vehicle-mounted charging system according to claim 3, wherein the first charging method is CHAdeMO, and the second charging method is CCS (Combined Charging System).

5. The vehicle-mounted charging system according to claim 1, further comprising:

a first connection detector for detecting connection of a charging cable to the first connector; and a second connection detector for detecting connection of a charging cable to the second connector, wherein the charging method determiner performs the determination based on a detection result from the first connection detector and a detection result from the second connection detector.

6. The vehicle-mounted charging system according to claim 5, further comprising:

a connection prohibitor for prohibiting, if a charging cable is connected to one of the first connector and the second connector, a charging cable from being connected to the other one of the first connector and the second connector.

7. The vehicle-mounted charging system according to claim 5, wherein the first charging method is CHAdeMO, and the second charging method is CCS (Combined Charging System).

* * * * *